Patented May 24, 1938

2,118,293

UNITED STATES PATENT OFFICE 2,118,293

THIOCARBANILID DERIVATIVE

Frederic A. Brinker, Denver, Colo.

No Drawing. Application March 20, 1935,
Serial No. 11,997

10 Claims. (Cl. 260—125)

This invention relates to a reaction product or derivative from thiocarbanilid having special properties adapting it to certain commercial uses such as for promoters for froth flotation methods for the separation of sulfide minerals, and for use in rubber manufacture and the like.

The present invention presents both the article and a method for making a substantially water-insoluble thiocarbanilid derivative which is very finely divided and therefore especially adapted for suspension in solutions and pulps in the industries, and to which the term peptized or partially peptized may be applied. These materials therefore necessarily have relatively great surface areas. This feature adapts them particularly for some uses, such as froth flotation mineral separation.

Stated more particularly, I have discovered that when thiocarbanilid (diphenyl thiourea) is dissolved in fairly concentrated sulfuric acid, and the solution is poured into or otherwise commingled with water, a new highly dispersed, substantially water-insoluble material precipitates, yielding a very finely divided (peptized) product. It may be employed as a suspension in the resulting solution or liquor or the liquor or solution may be partially separated yielding the product in the form of a wet paste, or all liquor may be eliminated and the product produced in a dry form as a very fine powder. This derivative product is much finer than thiocarbanilid, and while it may be classed as substantially insoluble in water as is thiocarbanilid, it is several times more soluble. For most uses the powder will be preferred, but in some instances the other forms are desirable.

Broadly stated, the invention resides in the substantially water-insoluble thiocarbanilid derivative produced by adding sulfuric acid solution of thiocarbanilid to water, having a much finer form and a much greater solubility than thiocarbanilid, and in the process of producing such derivative by dissolving in strong sulfuric acid and precipitating the derivative with water, and in the product as produced by such process.

As a specific procedure for the manufacture of the thiocarbanilid derivative or reaction product, the following is given as an example: One part by weight of thiocarbanilid is added to about 20 parts of concentrated sulfuric acid and these are mixed at normal temperatures until complete solution is obtained. This solution is then poured into about 50 parts of water, whereupon the new thiocarbanilid derivative product precipitates. The proportion of thiocarbanilid to sulfuric acid may be varied; however it is noted that if the thiocarbanilid is increased much above one part of thiocarbanilid to 9 or 10 parts of sulfuric acid the resultant product tends to become lumpy; whereas if the sulfuric acid is increased above about 20 parts of acid to one part of thiocarbanilid the product becomes slightly finer but this of course requires more acid. The proportions of water to which the solution is added may be varied within wide limits without affecting the result; for example the solution of one part of thiocarbanilid in 20 parts of sulfuric acid described above may be added to as little as 25 parts of water or to as much as 400 parts of water. These are not in fact absolute limits although they may represent about the practical limits for handling. It may be said however that in general the smallest amount of water consistent with convenience should be used, especially where the acid is to be recovered from the resultant solution, inasmuch as this obviously cheapens acid recovery.

The sulfuric acid strength preferred may be classed as concentrated, since it is preferable that it be at least as strong as three parts of 1.84 specific gravity $H_2SO_4$ to one part of water. The best strength seems to be about four parts of 1.84 specific gravity $H_2SO_4$ to one part of water because the thiocarbanilid goes readily into solution. If the acid of 1.84 gravity is used without dilution, the thiocarbanilid becomes gummy before going into solution, which does not occur with less concentrated acids, such as the 4:1 solution. The gumminess however does not affect the product; it merely slows up the procedure. On the other hand, if the acid is too weak, precipitation begins before solution is complete; this occurs for example when the ratio is 1:1. The dilution limit for practical purposes is between about 2 and 3 parts of 1.84 sp. gr. acid to one of water.

Having obtained the desired precipitation, the precipitated derivative may be recovered by decantation, filtration or otherwise, washed, dried and put up as a fine dry powder. It may also be put up as a wet paste containing a part of the acid solution, or washed and containing only water. Or it may for some purposes be used in suspension in the liquor in which it is precipitated, the chief use in this connection probably being in some mineral flotation processes where the acid is desirable or at least not objectionable. When the solution is separated the acid will be recovered for further use. Also, it may be used as a solution of thiocarbanilid in surfuric acid, the water in the ore pulp precipitating the product.

As to characteristics, the new derivative or reaction product is much finer than thiocarbanilid and is more efficient. Thus for mineral flotation uses it is vastly superior to thiocarbanilid as a promoter. Not only are the stated physical characteristics different from those of thiocarbanilid, but in view of its superior action, it appears to be and is assumed to be chemically different although I have not yet been able to determine what the chemical difference is, or whether there is a chemical rearrangement, or a different substitution, or whether there is any chemical change at all. It is conceivable that the fact of its having several times the solubility in water over thiocarbanilid, or its finer condition which makes it possible to disperse itself more widely, is the characteristic which makes it more valuable for its various uses. While both the new thiocarbanilid derivative and thiocarbanilid fall in the general classification of being substantially insoluble in water, the new derivative is nevertheless several times more soluble. It is well known in flotation practice that thiocarbanilid when fed to an ore pulp prior to flotation is not satisfactory, and that good results can be obtained only when possible to introduce it as a dry powder in the grinding mill, or to introduce it in a solvent into the flotation circuit prior to flotation. However, in the case of the new thiocarbanilid derivative of the present invention it can be introduced into the pulp in the flotation circuit in the form of a dry powder and will give very satisfactory results under those conditions, this distinguishing sharply from the action of thiocarbanilid itself.

This invention also provides a modified reagent carrier in the form of a preferably inert material with large surface area, such as diatomaceous earth, upon which is deposited the practically water-insoluble sulfuric acid derivative of thiocarbanilid above described, which is thereby afforded a maximum opportunity for dispersion or diffusion through any liquid medium when used therein for its intended action upon any of the constituents in the liquid, for example with the solid sulfides of a flotation ore pulp.

When a finely divided absorbent material is mixed in water with the practically water-insoluble derivative of thiocarbanilid above described or when the derivative is precipitated in water mixed with such a carrier, the insoluble chemical derivative becomes thoroughly distributed over and deposited upon the surface of the absorbent carrier, thereby producing a highly dispersed form of the chemical. Thus, when the earth or other carrier with its deposit of insoluble material is separated from the water, it may be added later to any other liquid to obtain therein a greatly increased diffusion of the chemical agent. Thus, it may be added to a mineral froth flotation pulp whereby the substantially insoluble thiocarbanilid derivative therefrom is widely diffused through the pulp to perform its maximum action upon the mineral constituents to be floated out.

In preparing the new reagent carrier, the end sought is the wide distribution of the derivative. The mixing of the absorbent material and the practically water-insoluble thiocarbanilid derivative must be done in a water solution or equivalent liquid not a solvent for the thiocarbanilid. The absorbent material may be diatomaceous earth, or other siliceous earths, or the like of large surface area. The proportion of absorbent material may be varied to suit the diffusion or dispersion necessary or desirable to be obtained from the use of this new product. The exact amount of water is not an important factor, since it is the medium by which the mixing and diffusion takes place, but it must of course be sufficient to produce a slurry satisfactory for handling and agitation. Thus, the carrier may be introduced into 5 to 25 times its volume of water, and the solution of thiocarbanilid in sulfuric acid added with intermixing which will be prolonged sufficiently for the precipitated derivative to become thoroughly deposited. This absorbent material carrying the practically water-insoluble product thoroughly distributed over its surface may be made as a liquid mixture containing the absorbent carrying said product, or the prepared absorbent may be separated from the solution and made as a wet paste, or it may be entirely freed from solution, dried and made up as a dry product, preferably a powder. Varying amounts of derivative may be deposited, and from 5% to 30% by weight has been very satisfactory.

As an example of a method of manufacture, about 20 parts of finely divided diatomaceous earth are mixed with 400 parts of water and, while agitating, a solution made from one part of thiocarbanilid dissolved in 18 or 20 parts of concentrated sulfuric acid is added to the slurry of absorbent diatomaceous earth in water. A practically insoluble thiocarbanilid derivative precipitates upon admixture with the water. This new mixture is thoroughly agitated causing the resultant practically water-insoluble precipitated product to become distributed or diffused over the surface of the diatomaceous earth which is then separated from the solution and made into a wet paste, or separated from the solution and dried and made into a dry powdered product.

Where the derivative is to be deposited upon diatomaceous earth or like inert carrier, other solvents for thiocarbanilid may be substituted such as ethyl alcohol or other aliphatic alcohol or acetic acid or orthotoluidin, preferably those solvents which are freely miscible with water. In fact, in this connection thiocarbanilid itself may be distributed through the water slurry and deposited upon the earth.

As an example of the value of reagents hereof, their use for the froth flotation separation of sulfide minerals may be cited. Thus: an ore containing about 15% of combined lead, copper, zinc and iron sulfides in a siliceous and limestone gangue, is ground in water to liberate the sulfides from each other and from the gangue and to form a flotation pulp. This ore pulp is introduced into a flotation machine, and $\frac{2}{100}$ of a pound of the thiocarbanilid sulfuric acid derivative per ton of ore is added together with cresylic acid. The pulp is then subjected to froth flotation and a lead-copper concentrate comes over in the froth. Here, the thiocarbanilid derivative acts as a promoter, the cresylic acid being the frothing agent required. Most of the iron and zinc sulfides remain in the tailing. Instead of the straight thiocarbanilid derivative, the inert carrier on which the derivative is deposited may be substituted; a somewhat greater quantity will be required. These reagents, including the modified carrier, produce greatly superior results to those produced by thiocarbanilid itself, now found on the market.

It is to be understood that the above disclosures are merely illustrative, and that they are not to be taken as limiting of the generic invention defined.

I claim:

1. A method for producing a thiocarbanilid derivative comprising dissolving thiocarbanilid in sulfuric acid at normal temperatures and precipitating the derivative by means of water.

2. A method according to claim 1 and the additional steps of separating the water solution and recovering the acid.

3. A method for obtaining a chemical compound comprising dissolving thiocarbanilid in strong sulfuric acid at normal temperatures, pouring the solution into water, and separating the resultant precipitate.

4. A method according to claim 3 and the additional steps of drying the precipitate and recovering it in the form of a fine powder.

5. A method according to claim 3 including the step of recovering the precipitate in the form of a wet paste.

6. As an article of manufacture, the substantially water-insoluble derivative of thiocarbanilid precipitated when a solution of thiocarbanilid in strong sulfuric acid at normal temperatures is introduced into water.

7. A method for the production of a thiocarbanilid derivative comprising dissolving thiocarbanilid in at least approximately ten parts of strong sulfuric acid at normal temperatures and precipitating the derivative with water.

8. A method according to claim 7 wherein the acid contains about four parts of 1.84 specific gravity $H_2SO_4$ to one part of water.

9. A method according to claim 7 wherein the acid is more concentrated than one part of water to two parts of 1.84 sp. gr. $H_2SO_4$.

10. A method for the manufacture of thiocarbanilid derivative comprising dissolving thiocarbanilid at normal temperatures in sulfuric acid containing about four parts of 1.84 sp. gr. $H_2SO_4$ to one part of water, and precipitating with water.

FREDERIC A. BRINKER.